G. R. DEAN.
PIPE.
APPLICATION FILED MAR. 18, 1907.
915,275.
Patented Mar. 16, 1909.
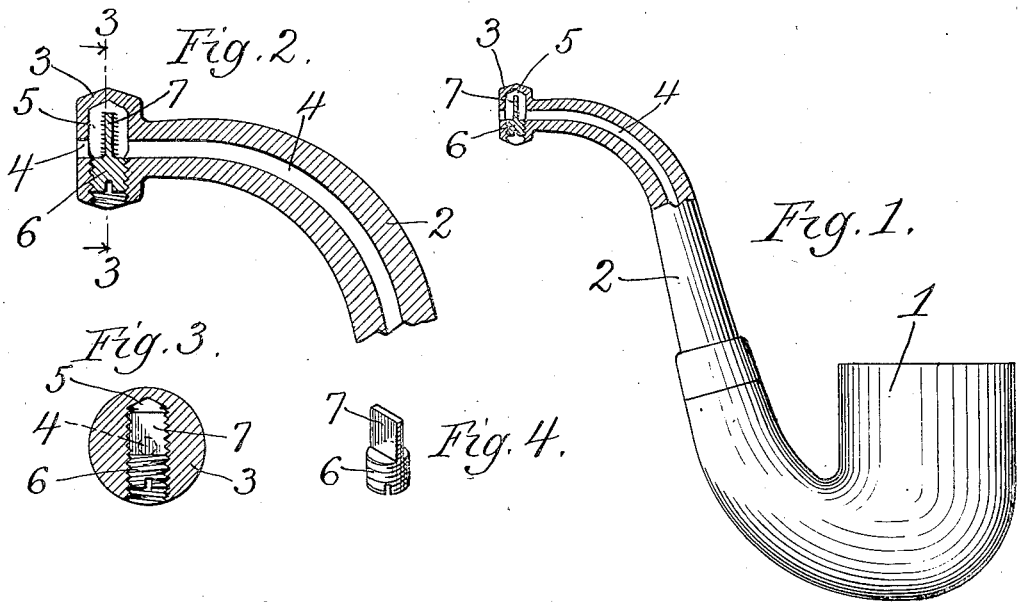
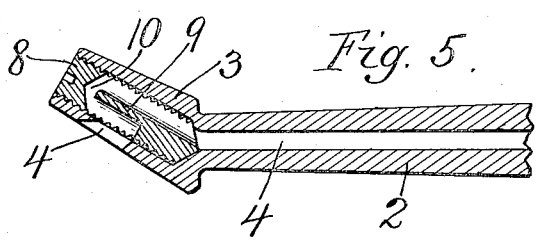
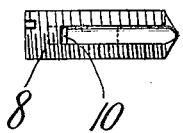
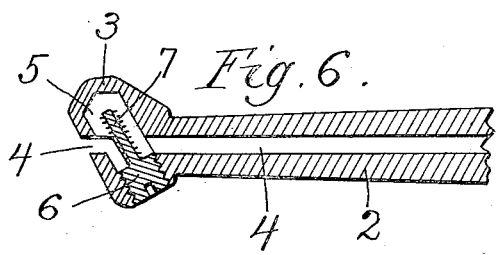
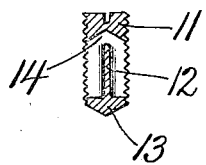
Witnesses.
Edward T. Wray,
Attie E. Johnson.
Inventor.
George R. Dean.
by Parker & Carter
Attorneys.

UNITED STATES PATENT OFFICE.

GEORGE R. DEAN, OF CHICAGO, ILLINOIS.

PIPE.

No. 915,275.

Specification of Letters Patent.  Patented March 16, 1909.

Application filed March 18, 1907.  Serial No. 362,844.

*To all whom it may concern:*

Be it known that I, GEORGE R. DEAN, a citizen of the United States, residing at Chicago, in the county of Cook and State of Illinois, have invented a certain new and useful Improvement in Pipes, of which the following is a specification.

My invention relates to pipes, and has for its object to provide means equivalent to a trap for the purpose of giving an unobstructed passage to the smoke and air through the pipe stem while at the same time preventing the entry of liquids into the stem.

Some of the forms in which I contemplate applying my invention are found in the accompanying drawings, wherein—

Figure 1 is a side view with the upper part of the stem shown in cross section; Fig. 2, an enlarged view of said cross section; Fig. 3, a section on line 3—3 of Fig. 2; Fig. 4, a detail of the plug of Figs. 2, 3 and 6. Fig. 5, a section similar to Fig. 2 of a modification; Fig. 6, a section similar to Fig. 2 of another modification; Fig. 7, a similar section of a like modification; Fig. 8, a view of the plug of Fig. 5, and Fig. 9, a view of the plug of Fig. 7.

Like parts are indicated by the same number in all the figures.

1 is the bowl of the pipe, 2 the stem and 3 the mouth piece. The smoke passage through the stem is indicated at 4. The mouth piece, referring to Fig. 2, is enlarged and has a cavity 5 into which is screwed the plug 6, the upper end of which is cut away on both sides so as to leave the diaphragm 7. When the plug is screwed into the position shown in Fig. 2 this diaphragm, being of the same diameter as the plug, fills all the parts of the cavity 5, leaving a passageway over the top of said diaphragm. The edges of the diaphragm, of course, are screw threaded like the body of the plug so that when the plug is screwed down, the screw threads on the edges take into the screw on the lower part of the cavity and if the process be continued until the top of the diaphragm is level with the lower part of the passage 4, the latter will be free so that the passage can be mechanically cleared. The threads in the upper part of the cavity are preferably cut away as shown in Fig. 2. When the parts are in the position shown in Fig. 2, the smoke passage is left free and of substantially uniform cross section throughout, but the diaphragm operates as a trap to prevent the entry of liquids into the pipe stem from the mouth side.

In Fig. 5, the mouth piece is differently shaped to suit the convenience of different smokers. The smoke passage, as before, consists of the two channels 4, 4, but the plug is differently shaped to accommodate itself to the new position. It consists of the body 8 but in this case the diaphragm 9 is differently constituted, the parts being cut out so as to leave an opening 10 over or through the top thereof, to permit the passage of the smoke. The trapping effect is the same as before.

In Fig. 6, the structure is very much like that of Fig. 2.

In Fig. 7, the plug 11 is inserted from the top and the diaphragm 12 extends up from a bottom piece 13 so as to leave the usual passageway over or through the top of the diaphragm at 14.

In Fig. 6, the forward part of the passage 4 is cut clear across the face of the mouth piece and the slot is carried around to the head of the plug 6, as shown, so that the trapping effect is still produced and the liquid does not run into the pipe or stay in the mouth piece.

It will be understood, of course, that my drawing is to be taken as diagrammatic and simply illustrative of my general idea, while at the same time some of the specific forms in which I have intended to utilize the invention are illustrated.

I have used the term "mouth piece" as a descriptive term though, of course, it is in effect nothing but that end of the stem which is held in the mouth. It may be and often is made of special size or shape. In the claims I use the term in its broad sense to indicate simply that end of the stem which is put in the mouth.

The use and operation of my invention will be readily understood. The mouth piece and stem should be properly positioned so as to suit the taste of various smokers. For that purpose, therefore, there should be various types. The essential quality is that there should be a trap like structure at the upper part of the stem adapted to permit the free passage of smoke, air and the like, but to prevent the entry of liquids into the pipe stem. The diaphragm in any or all of the positions shown presents no obstacle to the passage of smoke and air, but in all positions, when the pipe is properly hung in the mouth the effect is to trap the liquid.

The smoke and air passage in the pipe of my invention is downwardly turned at its outer end as shown for example, in Fig. 6, and the smoke descending, impinges on a laterally extended surface which scatters it in the mouth. In other words, the smoke instead of issuing from one or more holes against the tongue is distributed, in the structure of Fig. 6, at the sides as well as the front of the mouth piece. The passage way proper opens in opposition to a deflecting or distributing surface.

I claim:

1. A pipe comprising a bowl, a stem, a mouth piece, an enlarged aperture in the mouth piece connected with the passageway in the stem, and a removable plug adapted to enter the enlarged aperture screw threaded at one end and carrying a flattened diaphragm at the other.

2. A pipe comprising a bowl, a stem, a mouth piece, an aperture in said mouth piece connected with the passage in the stem, a removable screw threaded plug for said aperture carrying a diaphragm to form a circuitous air and smoke passage, and a liquid trap screw threaded on its edges.

3. A pipe comprising a bowl, a stem and a mouth piece having a circuitous smoke and air passage, the outer end of which is downwardly turned, and a deflecting surface beneath the end of such passage to scatter the smoke.

4. A pipe comprising a bowl, a stem and a mouth piece, a diaphragm in the mouth piece so as to form a circuitous smoke and air passage, the outer end of which is downwardly turned, and a deflecting surface beneath the end of such passage to scatter the smoke.

5. A pipe comprising a bowl, a stem and a mouth piece having a circuitous smoke and air passage, the outer end of which is downwardly turned, and a deflecting surface beneath the end of such passage to scatter the smoke, said deflecting surface formed by slotting the mouth piece.

6. A pipe comprising a bowl, a stem and a mouth piece, a diaphragm in the mouth piece so as to form a circuitous smoke and air passage, the outer end of which is downwardly turned, and a deflecting surface beneath the end of such passage to scatter the smoke, said deflecting surface formed by slotting the mouth piece.

GEORGE R. DEAN.

Witnesses:
ABBIE E. JOHNSON,
SOPHIE B. WERNER.